US010728473B2

(12) United States Patent
Zhao (10) Patent No.: US 10,728,473 B2
(45) Date of Patent: Jul. 28, 2020

(54) IMAGING CONTROL METHOD, IMAGING DEVICE, AND COMPUTER-READABLE STORAGE MEDIUM

(71) Applicant: GUANGDONG OPPO MOBILE TELECOMMUNICATIONS CORP., LTD., Dongguan, Guangdong (CN)

(72) Inventor: Zhengtao Zhao, Guangdong (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 0 days.

(21) Appl. No.: 16/396,525

(22) Filed: Apr. 26, 2019

(65) Prior Publication Data

US 2019/0342511 A1  Nov. 7, 2019

(30) Foreign Application Priority Data

May 4, 2018 (CN) .......................... 2018 1 0417410

(51) Int. Cl.
  *H04N 5/355* (2011.01)
  *H04N 5/232* (2006.01)
  *H04N 5/235* (2006.01)
(52) U.S. Cl.
  CPC ....... *H04N 5/35581* (2013.01); *H04N 5/2352* (2013.01); *H04N 5/2353* (2013.01); *H04N 5/2355* (2013.01)
(58) Field of Classification Search
  CPC ............. H04N 5/35581; H04N 5/2355; H04N 5/2353; H04N 5/2352; H04N 5/23229
  See application file for complete search history.

(56) References Cited

U.S. PATENT DOCUMENTS 7,825,969 B2 * 11/2010 Tico .................... H04N 5/23248
348/273
8,760,529 B2 * 6/2014 Okada .................. H04N 5/3742
348/221.1
(Continued)

FOREIGN PATENT DOCUMENTS

CN       103650480       3/2014
CN       105227858       1/2016
(Continued)

OTHER PUBLICATIONS

EPO, Office Action for EP Application No. 19172448.3, dated Jul. 17, 2019.
(Continued)

*Primary Examiner* — Shahbaz Nazrul
(74) *Attorney, Agent, or Firm* — Hodgson Russ LLP (57) ABSTRACT

The present disclosure discloses an imaging control method, an imaging device and a non-volatile computer-readable storage medium. The imaging control method includes: controlling the long-exposure pixels, the medium-exposure pixels and the short-exposure pixels to be exposed with an initial long-exposure parameter, an initial medium-exposure parameter and an initial short-exposure parameter respectively so as to acquire initial long-exposure pixel information, initial medium-exposure pixel information and initial short-exposure pixel information, calculating a corrected long-exposure parameter according to the initial long-exposure pixel information, calculating a corrected medium-exposure parameter and a corrected short-exposure parameter according to the corrected long-exposure parameter, controlling the pixel unit array to be exposed according to the corrected long-exposure parameter, the corrected medium-exposure parameter and the corrected short-exposure parameter, so as to output a high dynamic range image.

20 Claims, 6 Drawing Sheets

(56) References Cited

U.S. PATENT DOCUMENTS

| | | | |
|---|---|---|---|
| 9,241,127 B2* | 1/2016 | Sfaradi | H04N 5/91 |
| 9,338,372 B2* | 5/2016 | Cho | H04N 5/335 |
| 9,516,239 B2* | 12/2016 | Blanquart | A61B 1/045 |
| 9,554,056 B2* | 1/2017 | Touze | H04N 5/2355 |
| 9,560,290 B2* | 1/2017 | Jo | H04N 5/217 |
| 9,628,725 B2* | 4/2017 | Roh | H04N 5/3696 |
| 10,467,732 B2* | 11/2019 | Dewhurst | G06T 5/007 |
| 2009/0046947 A1 | 2/2009 | Kobayashi | |
| 2009/0091645 A1* | 4/2009 | Trimeche | H04N 5/235 |
| | | | 348/273 |
| 2011/0090361 A1 | 4/2011 | Kobayashi et al. | |
| 2016/0037043 A1 | 2/2016 | Wang et al. | |

FOREIGN PATENT DOCUMENTS

| | | |
|---|---|---|
| CN | 105323498 | 2/2016 |
| CN | 105578065 | 5/2016 |
| CN | 106791470 | 5/2017 |
| CN | 106982333 | 7/2017 |
| CN | 107409180 | 11/2017 |
| CN | 108632537 | 10/2018 |
| EP | 3270583 | 1/2018 |
| JP | 2005204196 | 7/2005 |
| WO | 2009029810 | 3/2009 |

OTHER PUBLICATIONS

SIPO, First Office Action for CN Application No. 201810417410.4, dated Aug. 28, 2019.
WIPO, English translation of the ISR and WO for PCT/CN2019/084316, dated Jul. 23, 2019.

* cited by examiner

| | 1 | 2 | 3 | 4 | 5 | 6 | 7 | 8 |
|---|---|---|---|---|---|---|---|---|
| 1 | R (L) | R (M) | G (L) | G (M) | R (L) | R (M) | G (L) | G (M) |
| 2 | R (M) | R (S) | G (M) | G (S) | R (M) | R (S) | G (M) | G (S) |
| 3 | G (L) | G (M) | B (L) | B (M) | G (L) | G (M) | B (L) | B (M) |
| 4 | G (M) | G (S) | B (M) | B (S) | G (M) | G (S) | B (M) | B (S) |
| 5 | R (L) | R (M) | G (L) | G (M) | R (L) | R (M) | G (L) | G (M) |
| 6 | R (M) | R (S) | G (M) | G (S) | R (M) | R (S) | G (M) | G (S) |
| 7 | G (L) | G (M) | B (L) | B (M) | G (L) | G (M) | B (L) | B (M) |
| 8 | G (M) | G (S) | B (M) | B (S) | G (M) | G (S) | B (M) | B (S) |

IMAGING CONTROL METHOD, IMAGING DEVICE, AND COMPUTER-READABLE STORAGE MEDIUM

CROSS-REFERENCE TO RELATED APPLICATION

This application claims priority to Chinese Patent Application No. 201810417410.4, filed May 4, 2018, the entire disclosure of which is incorporated herein by reference.

FIELD

The present disclosure relates to an imaging technology field, and more particularly to an imaging control method, an imaging device and a computer-readable storage medium.

BACKGROUND

At present, a high dynamic range image may be acquired by exposing a plurality of pixels of an image sensor synchronously with three different exposure times. However, in this way, the three different exposure times are calculated according to a histogram of the whole image Since the whole image does not has a linear brightness, calculating the three exposure times with the histogram of the whole image cannot realize a better AE (auto exposure) convergence.

DISCLOSURE

Embodiments of the present disclosure provide an imaging control method, an imaging device and a non-volatile computer-readable storage medium.

The imaging control method according to an embodiment of the present disclosure is applicable to an imaging device. The imaging device includes a pixel unit array including photosensitive pixels. The photosensitive pixels include long-exposure pixels, medium-exposure pixels and short-exposure pixels. The imaging control method includes: controlling the long-exposure pixels to be exposed with an initial long-exposure parameter so as to acquire initial long-exposure pixel information, controlling the medium-exposure pixels to be exposed with an initial medium-exposure parameter so as to acquire initial medium-exposure pixel information and controlling the short-exposure pixels to be exposed with an initial short-exposure parameter so as to acquire initial short-exposure pixel information, the initial long-exposure parameter including an initial long-exposure time and an initial long-exposure gain, the initial medium-exposure parameter including an initial medium-exposure time and an initial medium-exposure gain, the initial short-exposure parameter including an initial short-exposure time and an initial short-exposure gain; calculating a corrected long-exposure parameter according to the initial long-exposure pixel information, the corrected long-exposure parameter including a corrected long-exposure time and a corrected long-exposure gain; calculating a corrected medium-exposure parameter and a corrected short-exposure parameter according to the corrected long-exposure parameter, the corrected medium-exposure parameter including a corrected medium-exposure time and a corrected medium-exposure gain, the corrected short-exposure parameter including a corrected short-exposure time and a corrected short-exposure gain; and controlling the pixel unit array to be exposed according to the corrected long-exposure parameter, the corrected medium-exposure parameter and the corrected short-exposure parameter, so as to output a high dynamic range image.

The imaging device according to an embodiment of the present disclosure includes a pixel unit array including photosensitive pixels. The photosensitive pixels include long-exposure pixels, medium-exposure pixels and short-exposure pixels. The imaging device further includes a processor configured to: control the long-exposure pixels to be exposed with an initial long-exposure parameter so as to acquire initial long-exposure pixel information, control the medium-exposure pixels to be exposed with an initial medium-exposure parameter so as to acquire initial medium-exposure pixel information and control the short-exposure pixels to be exposed with an initial short-exposure parameter so as to acquire initial short-exposure pixel information, the initial long-exposure parameter including an initial long-exposure time and an initial long-exposure gain, the initial medium-exposure parameter including an initial medium-exposure time and an initial medium-exposure gain, the initial short-exposure parameter including an initial short-exposure time and an initial short-exposure gain; calculate a corrected long-exposure parameter according to the initial long-exposure pixel information, the corrected long-exposure parameter including a corrected long-exposure time and a corrected long-exposure gain; calculate a corrected medium-exposure parameter and a corrected short-exposure parameter according to the corrected long-exposure parameter, the corrected medium-exposure parameter including a corrected medium-exposure time and a corrected medium-exposure gain, the corrected short-exposure parameter including a corrected short-exposure time and a corrected short-exposure gain; and control the pixel unit array to be exposed according to the corrected long-exposure parameter, the corrected medium-exposure parameter and the corrected short-exposure parameter, so as to output a high dynamic range image.

The non-volatile computer-readable storage medium according to an embodiment of the present disclosure include computer-executable instructions that, when executed by the processor, cause the processor to perform the imaging control method described above.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings.

EMBODIMENTS OF THE PRESENT DISCLOSURE

Throughout the accompanying drawings, the same or similar elements or elements with the same or similar reference numbers have same or similar functions. The principle of the present disclosure will be described by taking the present disclosure being implemented in a proper calculation environment as an example. Embodiments described below are merely exemplary and used for explaining the present disclosure, and should not be understood as limitation to the present disclosure.

Figure 1:
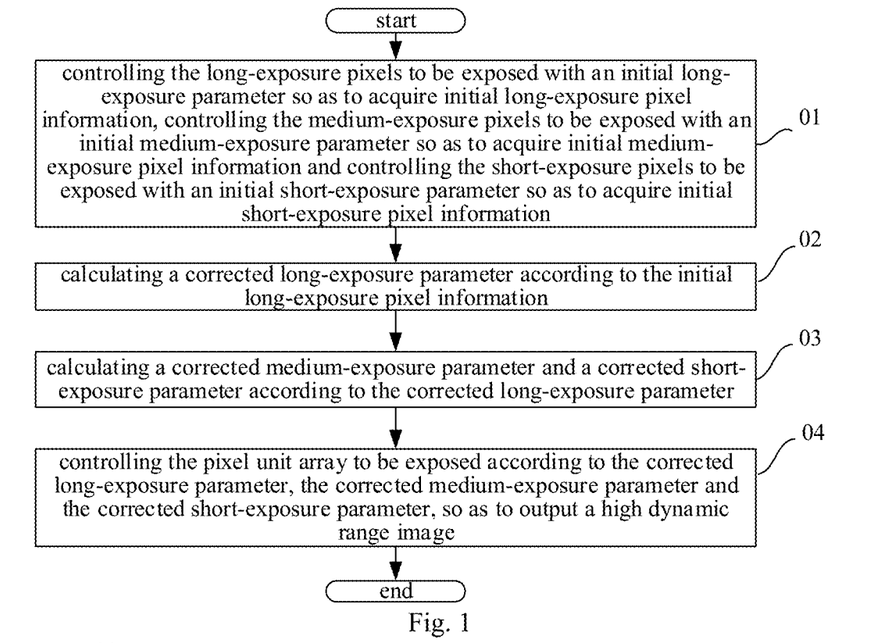
FIG. 1 is a flow chart of an imaging control method according to an embodiment of the present disclosure.
Figure 2:
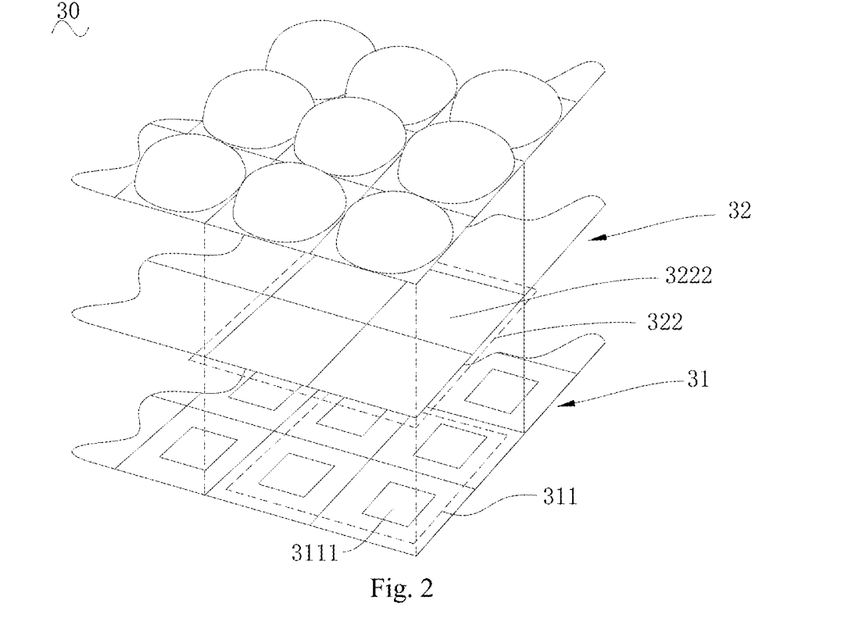
FIG. 2 is a schematic diagram of a partial structure of an imaging device according to another embodiment of the present disclosure.
Figure 3:
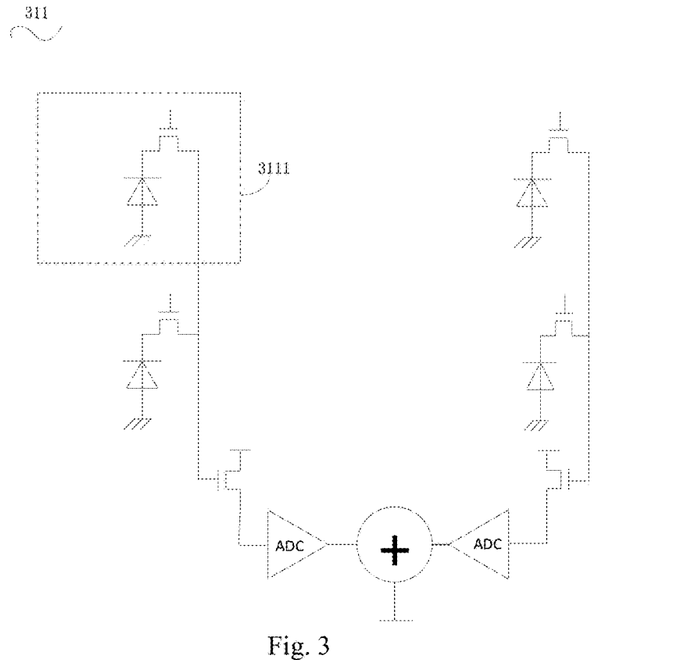
FIG. 3 is a schematic diagram of a partial structure of a pixel unit array of an imaging device according to an embodiment of the present disclosure.

As illustrated in FIG. 1-FIG. 3, the present disclosure provides an imaging control method for an imaging device 30. The imaging device 30 includes a pixel unit array 31 and a filter unit array 32 disposed above the pixel unit array 31. The pixel unit array 31 includes a plurality of pixel units 311. Each pixel unit 311 includes a plurality of photosensitive pixels 3111. The filter unit array 32 includes a plurality of filter units 322. Each filter unit 322 includes a plurality of sub-filers 3222. The number of sub-filters 3222 in each filter unit 22 is consistent with the number of photosensitive pixels 3111 in each pixel unit 311. Each sub-filer 3222 correspondingly covers one photosensitive pixel 3111. The pixel unit array 31 includes a Bayer array. The plurality of photosensitive pixels 3111 in the pixel unit array 31 includes a plurality of long-exposure pixels, a plurality of medium-exposure pixels and a plurality of short-exposure pixels. The long-exposure pixel refers to that the photosensitive pixel 3111 corresponds to a long-exposure time. The medium-exposure pixel refers to that the photosensitive pixel 3111 corresponds to a medium-exposure time. The short-exposure pixel refers to that the photosensitive pixel 3111 corresponds to a short-exposure time. The long-exposure time is greater than the medium-exposure time which is greater than the short-exposure time. The long-exposure pixels include photosensitive pixels 3111 of three channels including red channel, blue channel and green channel. The medium-exposure pixels include photosensitive pixels 3111 of three channels including red channel, blue channel and green channel. The short-exposure pixels include photosensitive pixels 3111 of three channels including red channel, blue channel and green channel.

In an embodiment of the present disclosure, each pixel unit 311 includes four photosensitive pixels 3111, which include a long-exposure pixel, two medium-exposure pixels and a short-exposure pixel. Four photosensitive pixels 3111 have the same color channel. In another embodiment of the present disclosure, the number of photosensitive pixels 3111 in the pixel unit 311 can be different.

The imaging control method according to an embodiment of the present disclosure includes the followings.

At block 01, the long-exposure pixels are controlled to be exposed with an initial long-exposure parameter to acquire initial long-exposure pixel information, the medium-exposure pixels are controlled to be exposed with an initial medium-exposure parameter to acquire initial medium-exposure pixel information, and the short-exposure pixels are controlled to be exposed with an initial short-exposure parameter to acquire initial short-exposure pixel information. The initial long-exposure parameter includes an initial long-exposure time and an initial long-exposure gain. The initial medium-exposure parameter includes an initial medium-exposure time and an initial medium-exposure gain. The initial short-exposure parameter includes an initial short-exposure time and an initial short-exposure gain.

At block 02, a corrected long-exposure parameter is calculated according to the initial long-exposure pixel information. The corrected long-exposure parameter includes a corrected long-exposure time and a corrected long-exposure gain.

At block 03, a corrected medium-exposure parameter and a corrected short-exposure parameter are calculated according to the corrected long-exposure parameter. The corrected medium-exposure parameter includes a corrected medium-exposure time and a corrected medium-exposure gain. The corrected short-exposure parameter includes a corrected short-exposure time and a corrected short-exposure gain.

At block 04, the pixel unit array 31 is controlled to be exposed according to the corrected long-exposure parameter, the corrected medium-exposure parameter and the corrected short-exposure parameter to output a high dynamic range image.

Figure 4:
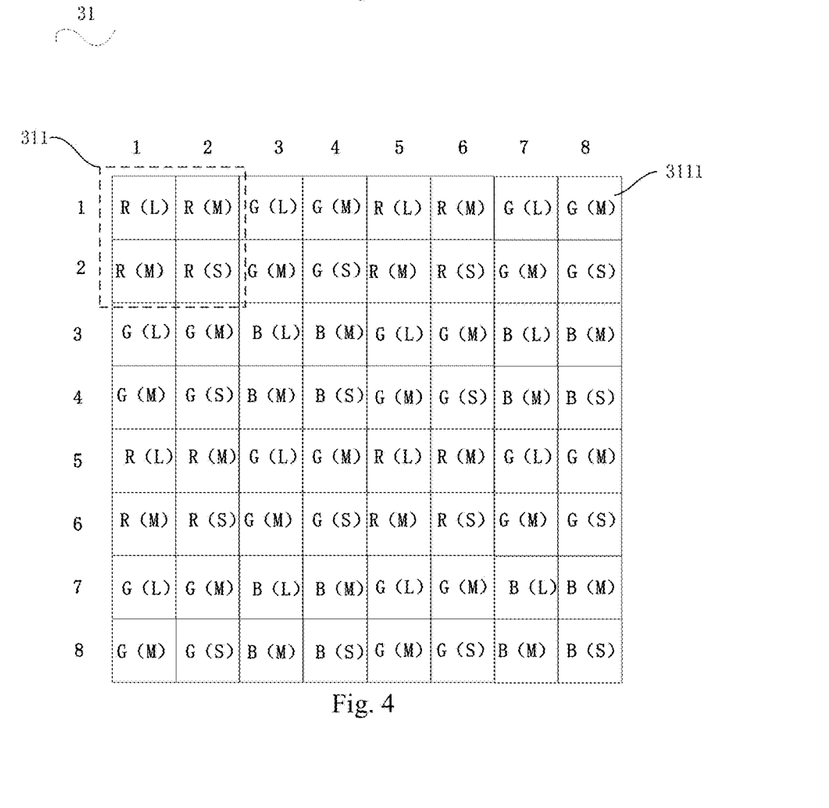
FIG. 4 is a schematic diagram of a partial structure of a pixel unit array in an imaging control method according to an embodiment of the present disclosure.

The structure of the pixel unit will be described in detail. As illustrated in FIG. 4, taking the pixel unit 311 of the red color channel as an example, the pixel unit 311 includes a long-exposure pixel R(1,1), two medium-exposure pixels R(1,2) and R(2,1) and a short-exposure pixel R(2,2). The long-exposure pixel R(1,1) is exposed with the initial long-exposure parameter, the medium-exposure pixels R(1,2) and R(2,1) are exposed with the initial medium-exposure parameter, and the short-exposure pixel R(2,2) is exposed with the initial short-exposure parameter synchronously. The initial long-exposure time of the long-exposure pixel R(1,1), the initial medium-exposure time of the medium-exposure pixels R(1,2) and R(2,1), and the initial short-exposure time of the short-exposure pixel R(2,2) are set in advance. The initial long-exposure gain of the long-exposure pixel R(1,1), the initial medium-exposure gain of the medium-exposure pixels R(1,2) and R(2,1), and the initial short-exposure gain of the short-exposure pixel R(2,2) are set in advance. Further, in order to ensure that the acquired high dynamic range image has less noisy points and that the noisy points are distributed uniformly in the whole high dynamic range image, in an embodiment of the present disclosure, the initial long-exposure gain, the initial medium-exposure gain and the initial short-exposure gain can be equal. The long-exposure pixel R(1,1), the medium-exposure pixels R(1,2) and R(2,1), the short-exposure pixel R(2,2) are exposed synchronously as follows: the medium-exposure pixels R(1,2) and R(2,1), the short-exposure pixel R(2,2) are exposed during an execution time of the exposure process of the long-exposure pixel R(1,1). In detail, the exposure processes of the long-exposure pixel R(1,1), the medium-exposure pixels R(1,2) and R(2,1), the short-exposure pixel R(2,2) can be performed as follows: an exposure process of the long-exposure pixel R(1,1) is controlled to be started firstly, and then the medium-exposure pixels R(1,2) and R(2,1), the short-exposure pixel R(2,2) are controlled to be exposed during the exposure process of the long-exposure pixel R(1,1). An exposure cut-off time of the medium-exposure pixels R(1,2) and R(2,1) and an exposure cut-off time of the short-exposure pixel R(2,2) are at an exposure cut-off time of the long-exposure pixel R(1,1) or before the exposure cut-off time of the long-exposure pixel R(1,1); or an exposure process of the long-exposure pixel R(1,1), an exposure process of the medium-exposure pixels R(1,2) and R(2,1), an exposure process of the short-exposure pixel R(2,2) are controlled to be started simultaneously, which means that the long-exposure pixel R(1,1), the medium-exposure pixels R(1,2) and R(2,1), the short-exposure pixel R(2,2) have the same exposure starting time. In this way, it is unnecessary to control the pixel unit array 31 to be exposed with the long-exposure time, the medium-exposure time and the short-exposure time in sequence, such that the initial long-exposure pixel information, the initial medium-exposure pixel information and the initial short-exposure pixel information can be acquired quickly with less time.

Subsequently, on one hand, interpolation is performed according to the initial long-exposure pixel information, the initial medium-exposure pixel information and the initial short-exposure pixel information to output one preview image, on the other hand, the initial long-exposure pixel information is extracted and the corrected long-exposure parameter is calculated according to the initial long-exposure pixel information. Subsequently, the corrected medium-exposure parameter and the corrected short-exposure parameter are calculated according to the corrected long-exposure parameter. At last, the long-exposure pixels in the pixel unit array 31 are controlled to be exposed with the corrected long-exposure parameter, the medium-exposure pixels in the pixel unit array 31 are controlled to be exposed with the corrected medium-exposure parameter, the short-exposure pixels in the pixel unit array 31 are controlled to be exposed with the corrected short-exposure parameter, and calculates the high dynamic range image according to pixel information outputted by the exposed pixel unit array 31.

In some embodiments, in order to ensure a uniform transition of brightness of the preview image, in an embodiment, the initial long-exposure time, the initial medium-exposure time and the initial short-exposure time should meet a condition of: initial long-exposure time/initial medium-exposure time=initial medium-exposure time/initial short-exposure time.

In the related art, the high dynamic range image may be acquired by synchronously exposing the plurality of photosensitive pixels in the pixel unit array 31 with three different exposure times. However, in this way, the three different exposure times are calculated according to a histogram of the whole image Since the whole image does not has a linear brightness, calculating the three exposure times with the histogram of the whole image cannot realize a better auto exposure convergence.

With the imaging control method according to the embodiments of the present disclosure, the long-exposure time, the medium-exposure time and the short-exposure time are corrected according to the pixel information of the long-exposure pixels. Since the image corresponding to the long exposure pixels has the linear brightness, the long-exposure time, the medium-exposure time and the short-exposure time acquired using the pixel information of the long-exposure pixels are more accurate, and the pixel unit array 31 can be controlled to be exposed with the accurate exposure time, such that a high dynamic range image with a better quality can be acquired.

Figure 5:
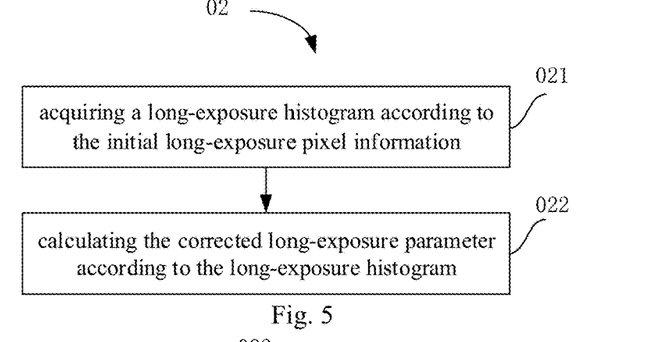
FIG. 5 is a flow chart of an imaging control method according to an embodiment of the present disclosure.
Figure 6:
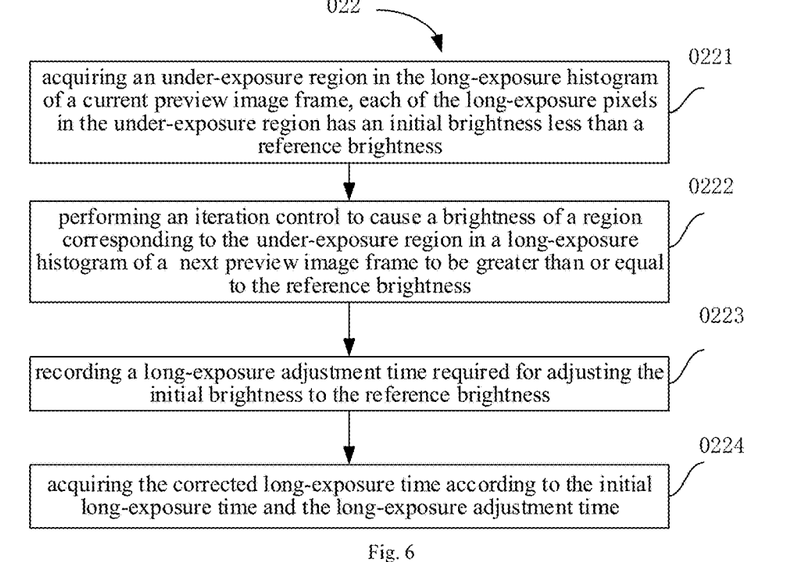
FIG. 6 is a flow chart of an imaging control method according to an embodiment of the present disclosure.

As illustrated in FIG. 5 and FIG. 6, in some embodiments, the act of calculating the corrected long-exposure parameter according to the initial long-exposure pixel information at block 02 may include followings.

At block 021, a long-exposure histogram is acquired according to the initial long-exposure pixel information.

At block 022, the corrected long-exposure parameter is calculated according to the long-exposure histogram.

The act of calculating the corrected long-exposure parameter according to the long-exposure histogram at block 022 may include the followings.

At block 0221, an under-exposure region in the long-exposure histogram of a current preview image frame is acquired, each of the long-exposure pixels in the under-exposure region has an initial brightness less than a reference brightness.

At block 0222, an iteration control is performed to cause a brightness of a region corresponding to the under-exposure region in a long-exposure histogram of a next preview image frame to be greater than or equal to the reference brightness.

At block 0223, a long-exposure adjustment time required for adjusting the initial brightness to the reference brightness is recorded.

At block 0224, the corrected long-exposure time is acquired according to the initial long-exposure time and the long-exposure adjustment time.

In detail, after the long-exposure pixels, the medium-exposure pixels and the short-exposure pixels are exposed, a current preview image frame can be acquired according to the initial long-exposure pixel information, the initial medium-exposure pixel information and the initial short-exposure pixel information.

For the long-exposure pixels, the long-exposure histogram is generated according to a plurality of pieces of initial long-exposure pixel information outputted by a plurality of long-exposure pixels. The long-exposure histogram represents a brightness distribution of the plurality of pieces of initial long-exposure pixel information. Subsequently, the plurality of long-exposure pixels each having the initial brightness corresponding to the initial long-exposure pixel information less than the reference brightness can be determined from the long-exposure histogram, these long-exposure pixels corresponding to the under-exposure region in the current preview image frame. In order to enable the under-exposure region in the current preview image frame to acquire sufficient exposure, i.e., enabling a brightness of a region corresponding to the under-exposure region in a long-exposure histogram of a next preview image frame to be greater than or equal to the reference brightness, a long-exposure adjustment time may be determined, a value of the long-exposure adjustment time may be a negative value or a positive value. Subsequently, the long-exposure pixels are controlled to be exposed with an adjusted long-exposure time and a plurality of pieces of adjusted long-exposure pixel information can be outputted. The adjusted long-exposure time may be a sum of the initial long-exposure time and the long-exposure adjustment time. An adjusted long-exposure histogram is generated according to the plurality of pieces of adjusted long-exposure pixel information, and the plurality of long-exposure pixels each having an adjusted brightness corresponding to the adjusted long-exposure pixel information less the reference brightness are acquired from the long-exposure histogram, these plurality of long-exposure pixels corresponding to the under-exposure region in the next preview image frame. If the plurality of long-exposure pixels each with the adjusted brightness less than the reference brightness cannot be acquired, it indicates that there is no under-exposure region in the next preview image frame. If the plurality of long-exposure pixels each with the adjusted brightness less than the reference brightness are acquired, it indicates that there is the under-exposure region in the next preview image frame, then the long-exposure time of the long-exposure pixels is adjusted continually, until the preview image does not contain the under-exposure region. The long-exposure time of the long-exposure pixels corresponding to the preview image without the under-exposure region can be configured as the corrected long-exposure time.

There may be one or more long-exposure histograms. When there is a long-exposure histogram, one long-exposure histogram is generated according to the initial long-exposure pixel information outputted by all the long-exposure pixels. When there are more than one long-exposure histograms, the region of long-exposure pixels is divided into a plurality of regions, and one long-exposure histogram is generated according to the initial long-exposure pixel information of the plurality of long-exposure pixels in a region. In this way, the plurality of regions correspond to the plurality of long-exposure histograms. By dividing the region, the accuracy of correcting the long-exposure time each time may be improved, thus speeding up the correction process of the long-exposure time.

By correcting the long-exposure time of the long-exposure pixels according to the long-exposure histogram acquired by the initial long-exposure pixel information, the accurate corrected long-exposure time can be acquired, thus facilitating acquisition of the high dynamic range image.

Figure 7:
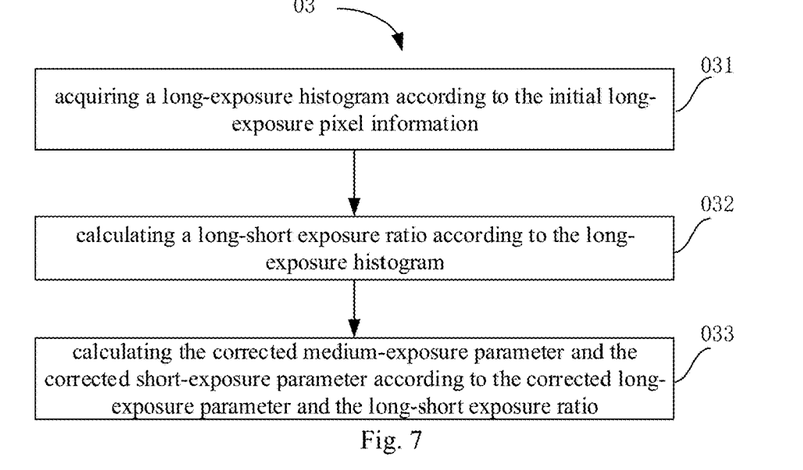
FIG. 7 is a flow chart of an imaging control method according to an embodiment of the present disclosure.
Figure 8:
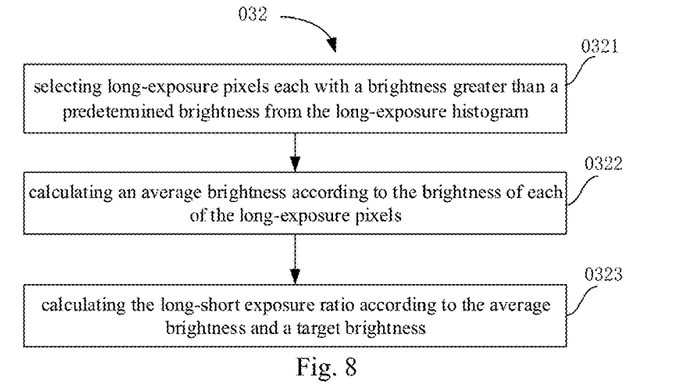
FIG. 8 is a flow chart of an imaging control method according to an embodiment of the present disclosure.

As illustrated in FIG. 7 and FIG. 8, in some embodiments, the act of calculating the corrected medium-exposure parameter and the corrected short-exposure parameter according to the corrected long-exposure parameter at block 03 may include the followings.

At block 031, a long-exposure histogram is acquired according to the initial long-exposure pixel information.

At block 032, a long-short exposure ratio is calculated according to the long-exposure histogram.

At block 033, the corrected medium-exposure parameter and the corrected short-exposure parameter are calculated according to the corrected long-exposure parameter and the long-short exposure ratio.

The act of calculating the long-short exposure ratio according to the long-exposure histogram at block 032 may include the followings.

At block 0321, long-exposure pixels each with a brightness greater than a predetermined brightness are selected from the long-exposure histogram.

At block 0322, an average brightness is calculated according to the brightness of each of the long-exposure pixels.

At block 0323, the long-short exposure ratio is calculated according to the average brightness and a target brightness.

There may be one or more long-exposure pixels each with the brightness greater than the predetermined brightness in the long-exposure histogram.

The long-exposure histogram is generated according to the initial long-exposure pixel information. Subsequently, the plurality of long-exposure pixels each with the brightness greater than the predetermined brightness PRE are selected from the long-exposure histogram, and the average brightens AVE is calculated according to the brightness of each of the plurality of selected long-exposure pixels. Subsequently, the long-short exposure ratio $Ratio_{long,\ short}$ is calculated according to the average brightens AVE and the target brightness PRE. In detail, $Ratio_{long,\ short}$=AVE/PRE. Assuming that the corrected long-exposure time is $T_L$ and the corrected short-exposure time is $T_S$, $T_L/T_S$= $Ratio_{long,\ short}$=AVE/PRE, i.e., $T_S=(T_L*PRE)/AVE$. The average brightness AVE acquired according to the plurality of long-exposure pixels each with the brightness greater than the predetermined brightness PRE represents a level of the brightness of the long-exposure pixels. When the average brightness AVE is high, it indicates that the plurality of long-exposure pixels have a high brightness, in this case, there may be an over-exposure part in the long-exposure pixels. The exposure time of the short-exposure pixels is low, the photosensitive pixels 3111 receive less light and output a low brightness. In order to reduce the brightness of the over-exposure part, the brightness of the short-exposure pixels may suppress the brightness of the pixels in the over-exposure part. The corrected short-exposure time $T_S$ of the short-exposure pixels can be determined according to the corrected long-exposure time $T_L$ and the long-short exposure ratio.

Subsequently, the corrected medium-exposure time $T_M$ is calculated according to the corrected long-exposure time $T_L$ and the corrected short-exposure time $T_S$. In detail, $T_L/T_M=T_M/T_S$, i.e., $T^2_M=T_L*T_S$. In other words, the long-medium exposure ratio $Ratio_{long,\ medium}$ is equal to the medium-short exposure ratio $Ratio_{medium,\ short}$. The long-medium exposure ratio $Ratio_{long,\ medium}$ is a ratio of the corrected long-exposure time $T_L$ to the corrected medium-exposure time $T_M$, i.e., $Ratio_{long,\ medium}=T_L/T_M$. The medium-short exposure ratio $Ratio_{medium,\ short}$ is a ratio of the corrected medium-exposure time $T_M$ to the corrected short-exposure time $T_S$, i.e., $Ratio_{medium,\ short}=T_M/T_S$. In this way, the corrected medium-exposure time can be acquired.

After the corrected long-exposure time, the corrected medium-exposure time and the corrected short-exposure time are calculated, the plurality of photosensitive pixels 3111 in the pixel unit array 31 can be controlled to be exposed according to different corrected exposure times synchronously, so as to output the corrected pixel information, and the high dynamic range image can be acquired according to the corrected pixel information. The long-exposure pixels are exposed with the corrected long-exposure time, the medium-exposure pixels are exposed with the corrected medium-exposure time and the short-exposure pixels are exposed with the corrected short-exposure time synchronously, after the exposure, the high dynamic range image can be acquired according to the outputted pixel information.

In detail, the long-exposure pixels, the medium-exposure pixels and the short-exposure pixels in each pixel unit 311 are controlled to be exposed synchronously. The exposure time of the long-exposure pixels is the corrected long-exposure time. The exposure time of the medium-exposure pixels is the corrected medium-exposure time. The exposure time of the short-exposure pixels is the corrected short-exposure time. Taking the pixel unit 311 of the red color channel in FIG. 4 as an example, R(1,1) is the long-exposure pixel, R(1,2) and R(2,1) are the medium-exposure pixels and R(2,2) is the short-exposure pixel. The photosensitive pixel 3111 in the pixel unit 311 can be exposed as follows: an exposure process of the long-exposure pixel R(1,1) is controlled to be firstly started with the corrected long-exposure time, and then during the exposure process of the long-exposure pixel R(1,1), the medium-exposure pixels R(1,2) and R(2,1) are controlled to be exposed with the corrected medium-exposure time, and the short-exposure pixel R(2,2) is controlled to be exposed with the corrected short-exposure time. The medium-exposure pixels R(1,2) and R(2,1) have the same exposure starting time. The exposure cut-off time of the medium-exposure pixels R(1,2) and R(2,1) and the exposure cut-off time of the short-exposure pixel R(2,2) are at or before the exposure cut-off time of the long-exposure pixel R(1,1). In another embodiment, an exposure process of the long-exposure pixel R(1,1), an exposure process of the medium-exposure pixels R(1,2) and R(2,1), and an exposure process of the short-exposure pixel R(2,2) are started at the same time, which means that the long-exposure pixel R(1,1), the medium-exposure pixels R(1,2) and R(2,1), and the short-exposure pixel R(2,2) have the same exposure starting time. The exposure time of the long-exposure pixel R(1,1) is the corrected long-exposure time. Both the exposure time of the medium-exposure pixel R(1,2) and the exposure time of the medium-exposure pixel R(2,1) are the corrected medium-exposure time. The exposure time of the short-exposure pixel R(2,2) is the corrected short-exposure time. In this way, it is unnecessary to control the pixel unit array 31 to be exposed with the long-exposure time, the medium-exposure time and the short-exposure time in sequence, such that the high dynamic range image can be acquired with less time.

After the exposure, each pixel unit 311 outputs four pieces of corrected pixel information Taking the pixel unit 311 of the red color channel in FIG. 4 as an example, the output of the pixel unit 311 includes the corrected pixel information outputted by the long-exposure pixel R(1,1), the corrected pixel information outputted by the medium-exposure pixels R(1,2) and R(2,1) and the corrected pixel information outputted by the short-exposure pixel R(2,2). Subsequently, merged pixel information of each pixel unit 311 is acquired according to the four pieces of corrected pixel information. In detail, taking the pixel unit 311 of the red color channel in FIG. 4 as an example, merged pixel information M=R(1,2)*a+[R(1,2)+R(2,1)]*b+R(2,2)*c, where a, b and c respectively represent a weight value of the long-exposure pixel, a weight value of the medium-exposure pixel and a weight value of short-exposure pixel. For another example, when the pixel unit 311 contains 2*4 photosensitive pixels 3111, including 2 long-exposure pixels, 4 medium-exposure pixels and 2 short-exposure pixels. The merged pixel information can be acquired as follows: the corrected pixel information of 2 long-exposure pixels is combined to obtain merged correction long-exposure pixel information R1, the corrected pixel information of 4 medium-exposure pixels is combined to obtain merged correction medium-exposure pixel information R2, the corrected pixel information of 2 short-exposure pixels is combined to obtain merged correction short-exposure pixel information R3, and the merged pixel information M=R1*a+R2*b+R3*c. In this way, the photosensitive pixels 3111 in each pixel unit 311 are controlled to be respectively exposed with the long-exposure time, the medium-exposure time and the short-exposure time in a synchronization way and the merged pixel information of each pixel unit 311 is outputted. Subsequently, since a gray level of each merged pixel information acquired according to the corrected long-exposure pixel information, the corrected medium-exposure pixel information and the corrected short-exposure pixel information may change, it is required to compress the gray level of each merged pixel information after acquiring the merged pixel information. After the compression, the high dynamic range image may be acquired by interpolation on the plurality of pieces merged pixel information. Since the exposure times of the long-exposure pixel, the medium-exposure pixel and the short-exposure time are corrected, a dim part of the final image can be compensated with the corrected long-exposure pixel information outputted by exposing the long-exposure pixels with the corrected long-exposure time, and a bright part of the final image can be suppressed with the corrected short-exposure pixel information outputted by exposing the short-exposure pixels with the corrected short-exposure time. The average brightness of the whole image adopts the corrected medium-exposure pixels outputted by exposing the medium-exposure pixels with the corrected medium-exposure time as reference. In this way, the final image does not contain the over-exposure region and the under-exposure region, the image has the uniform transition of brightness and an overall brightness of the image is neither too high nor too low, further the image has a higher dynamic range and a better imaging effect. In addition, since the corrected long-exposure time, the corrected medium-exposure time and the corrected short-exposure time are determined on the basis of the long-exposure histogram, the long-exposure histogram has the linear brightness, such that the high dynamic range image acquired according to the corrected long-exposure time, the corrected medium-exposure time and the corrected short-exposure time has a better exposure effect.

In some embodiments, the long-short exposure $Ratio_{long, short}$ according to an embodiment of the present disclosure may be: $Ratio_{long, short}=(T_L*G_L)/(T_S*G_S)$, where $G_L$ represents the corrected long-exposure gain, $G_S$ represents the corrected short-exposure gain. In an embodiment of the present disclosure, in order to ensure that the whole high dynamic range image has less noisy points and uniform distribution of the noisy points, the corrected long-exposure gain $G_L$ and the corrected short-exposure gain $G_S$ are equal, such that $Ratio_{long, short}=T_L/T_S$. Similarly, the long-medium exposure $Ratio_{long, medium}$ according to an embodiment of the present disclosure may be: $Ratio_{long, medium}=(T_L*G_L)/(T_M*G_M)$, where $G_M$ represents the corrected medium-exposure gain. When the corrected long-exposure gain $G_L$ and the corrected medium-exposure gain $G_M$ are equal, $Ratio_{long, medium}=T_L/T_M$. The medium-short exposure $Ratio_{medium, short}$ according to an embodiment of the present disclosure may be: $Ratio_{medium, short}=(T_M*G_M)/(T_S*G_S)$. When the corrected medium-exposure gain $G_M$ and the corrected short-exposure gain $G_S$ are equal, $Ratio_{medium, short}=T_M/T_S$.

In some embodiments, the initial long-exposure gain, the initial medium-exposure gain, the initial short-exposure gain, the corrected long-exposure gain, the corrected medium-exposure gain and the corrected short-exposure gain are equal. one exposure gain is selected to ensure the high dynamic range image captured by the imaging device 30 to have less noisy points.

In some embodiments, the initial long-exposure gain, the initial medium-exposure gain, the initial short-exposure gain, the corrected long-exposure gain, the corrected medium-exposure gain and the corrected short-exposure gain may be different. The initial long-exposure gain, the initial medium-exposure gain, the initial short-exposure gain, the corrected long-exposure gain, the corrected medium-exposure gain and the corrected short-exposure gain can be acquired by an exposure table. In the exposure table, each exposure time has a corresponding exposure gain. After determining the exposure time, the exposure gain corresponding to the exposure time can be determined by looking-up the exposure table.

In some embodiments, when the imaging device 30 adopts the imaging control method according to the embodiment of the present disclosure to output the preview image, since the long-exposure pixels in the pixel unit array 31 are exposed with the long-exposure time, an output frame rate of the preview image may be reduced. When a display frame rate of the imaging device 30 is greater than the output frame rate of the preview image, the output frame rate does not match with the display frame rate, which may cause a slow speed and unsmooth of the imaging device 30. In order to avoid the problem, the imaging device 30 may be controlled to reduce the display frame rate so as to enable the display frame rate to match with the output frame rate. In another embodiment, when the display frame rate is higher than the output frame rate, assuming that the preview image at a moment is not generated, the preview image at this moment cannot be outputted and displayed, such that the preview image at a last moment may be outputted and displayed, i.e., the preview image at the last moment may supplement to a space caused by the preview image at this moment. In this way, the slow speed of the imaging device 30 due to the display frame rate not matching with the output frame rate can be avoided, thus improving user experience.

Figure 9:
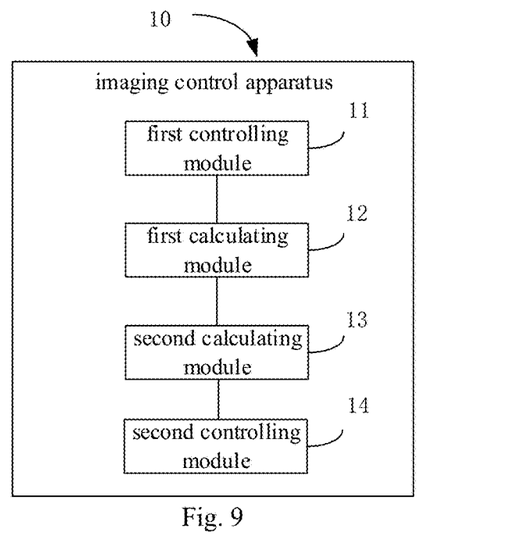
FIG. 9 is a block diagram of an imaging control apparatus according to an embodiment of the present disclosure.

The present disclosure further provides an imaging control device according to an embodiment of the present disclosure. As illustrated in FIG. 9, the present disclosure further provides an imaging control apparatus 10 for an imaging device. The imaging control method according to an embodiment of the present disclosure can be implemented by the imaging control apparatus 10 according to an embodiment of the present disclosure. The imaging control apparatus 10 includes a first controlling module 11, a first calculating module 12, a second calculating module 13 and a second controlling module 14. The act at block 01 can be implemented by the first controlling module 11. The act at block 02 can be implemented by the first calculating module 12. The act at block 03 can be implemented by the second calculating module 13. The act at block 04 can be implemented by the second controlling module 14. In other words, the first controlling module 11 can be configured to control the long-exposure pixels to be exposed with an initial long-exposure parameter so as to acquire initial long-exposure pixel information, to control the medium-exposure pixels to be exposed with an initial medium-exposure parameter so as to acquire initial medium-exposure pixel information and to control the short-exposure pixels to be exposed with an initial short-exposure parameter so as to acquire initial short-exposure pixel information. The initial long-exposure parameter includes an initial long-exposure time and an initial long-exposure gain. The initial medium-exposure parameter includes an initial medium-exposure time and an initial medium-exposure gain. The initial short-exposure parameter includes an initial short-exposure time and an initial short-exposure gain. The first calculating module 12 can be configured to calculate a corrected long-exposure parameter according to the initial long-exposure pixel information. The corrected long-exposure parameter includes a corrected long-exposure time and a corrected long-exposure gain. The second calculating module 13 can be configured to calculate a corrected medium-exposure parameter and a corrected short-exposure parameter according to the corrected long-exposure parameter. The corrected medium-exposure parameter includes a corrected medium-exposure time and a corrected medium-exposure gain. The corrected short-exposure parameter includes a corrected short-exposure time and a corrected short-exposure gain. The second controlling module 14 can be configured to control the pixel unit array to be exposed according to the corrected long-exposure parameter, the corrected medium-exposure parameter and the corrected short-exposure parameter, so as to output a high dynamic range image.

Figure 10:
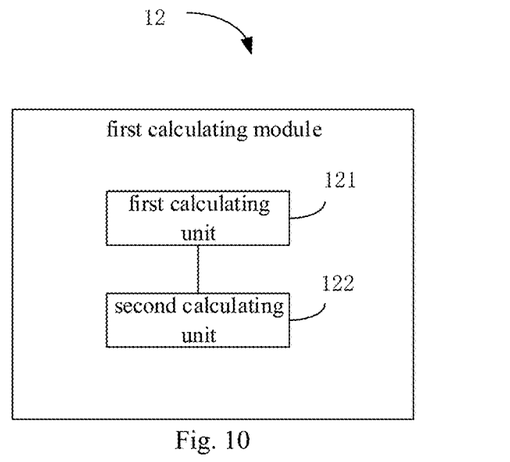
FIG. 10 is a block diagram of a first calculating module in an imaging control apparatus according to an embodiment of the present disclosure.
Figure 11:
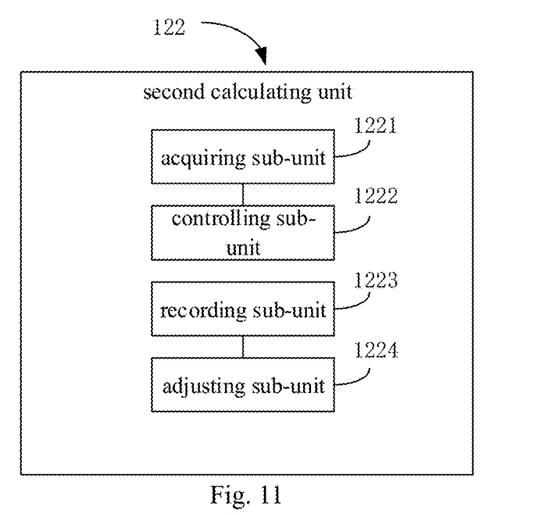
FIG. 11 is a block diagram of a second calculating unit in an imaging control apparatus according to an embodiment of the present disclosure.

As illustrated in FIG. 10 and FIG. 11, in some embodiments, the first calculating module 12 includes a first calculating unit 121 and a second calculating unit 122. The second calculating unit 122 includes an acquiring sub-unit 1221, a controlling sub-unit 1222, a recording sub-unit 1223 and an adjusting sub-unit 1224. The act at block 021 can be implemented by the first calculating unit 121. The act at block 022 can be implemented by the second calculating unit 122. The act at block 0221 can be implemented by the acquiring sub-unit 1221. The act at block 0222 can be implemented by the controlling sub-unit 1222. The act at block 0223 can be implemented by the recording sub-unit 1223. The act at block 0224 can be implemented by the adjusting sub-unit 1224.

The first calculating unit 121 can be configured to acquire a long-exposure histogram according to the initial long-exposure pixel information. The second calculating unit 122 can be configured to calculate the corrected long-exposure parameter according to the long-exposure histogram. The acquiring sub-unit 1221 can be configured to acquire an under-exposure region where long-exposure pixels each with an initial brightness less than a reference brightness are located in a long-exposure histogram of a current preview image frame. The controlling sub-unit 1222 can be configured to perform an iteration control to cause a brightness of a region corresponding to the under-exposure region in a long-exposure histogram of a next preview image frame to be greater than or equal to the reference brightness. The recording sub-unit 1223 can be configured to record a long-exposure adjustment time required for adjusting the initial brightness to the reference brightness. The adjusting sub-unit 1224 can be configured to acquire the corrected long-exposure time according to the initial long-exposure time and the long-exposure adjustment time.

Figure 12:
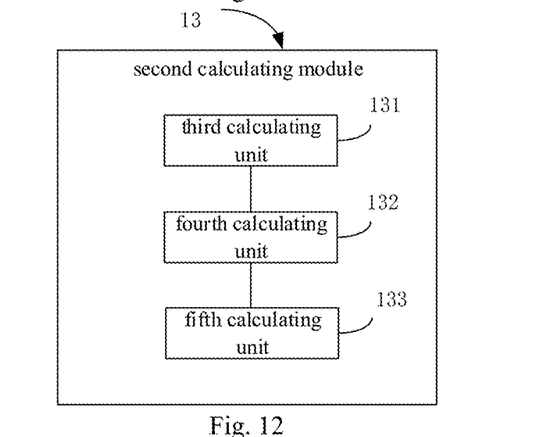
FIG. 12 is a block diagram of a second calculating module in an imaging control apparatus according to an embodiment of the present disclosure.
Figure 13:
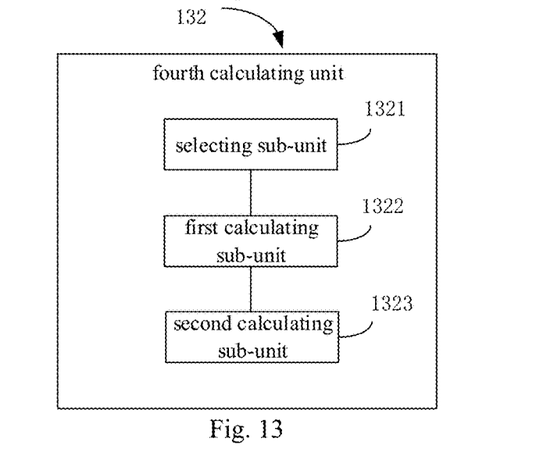
FIG. 13 is a block diagram of a fourth calculating unit in an imaging control apparatus according to an embodiment of the present disclosure.

As illustrated in FIG. 12 and FIG. 13, in some embodiments, the second calculating module 13 includes a third calculating unit 131, a fourth calculating unit 132 and a fifth calculating unit 133. The fourth calculating unit 132 includes a selecting sub-unit 1321, a first calculating sub-unit 1322 and a second calculating sub-unit 1323. The act at block 031 can be implemented by the third calculating unit 131. The act at block 032 can be implemented by the fourth calculating unit 132. The act at block 033 can be implemented by the fifth calculating unit 133. The act at block 0321 can be implemented by the selecting sub-unit 1321. The act at block 0322 can be implemented by the first calculating sub-unit 1322. The act at block 0323 can be implemented by the second calculating sub-unit 1323.

In other words, the third calculating unit 131 can be configured to acquire a long-exposure histogram according to the initial long-exposure pixel information. The fourth calculating unit 132 can be configured to calculate a long-short exposure ratio according to the long-exposure histogram. The fifth calculating unit 133 can be configured to calculate the corrected medium-exposure parameter and the corrected short-exposure parameter according to the corrected long-exposure parameter and the long-short exposure ratio. The selecting sub-unit 1321 can be configured to select long-exposure pixels each with a brightness greater than a predetermined brightness from the long-exposure histogram. The first calculating sub-unit 1322 can be configured to calculate an average brightness according to the brightness of each of the long-exposure pixels. The second calculating sub-unit 1323 can be configured to calculate the long-short exposure ratio according to the average brightness and a target brightness.

Figure 14:
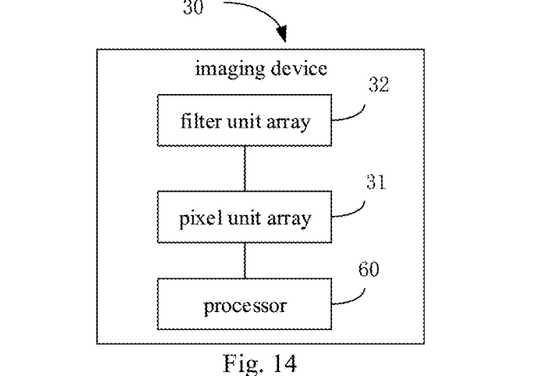
FIG. 14 is a block diagram of an imaging device according to an embodiment of the present disclosure.

The present disclosure further provides an imaging device. As illustrated in FIG. 14, the imaging device 30 includes a processor 60. The acts at block 01-04 can be implemented by the processor 60. In other words, the processor 60 can be configured to control the long-exposure pixels to be exposed with an initial long-exposure parameter so as to acquire initial long-exposure pixel information, control the medium-exposure pixels to be exposed with an initial medium-exposure parameter so as to acquire initial medium-exposure pixel information and control the short-exposure pixels to be exposed with an initial short-exposure parameter so as to acquire initial short-exposure pixel information, the initial long-exposure parameter including an initial long-exposure time and an initial long-exposure gain, the initial medium-exposure parameter including an initial medium-exposure time and an initial medium-exposure gain, the initial short-exposure parameter including an initial short-exposure time and an initial short-exposure gain; calculate a corrected long-exposure parameter according to the initial long-exposure pixel information, the corrected long-exposure parameter including a corrected long-exposure time and a corrected long-exposure gain; calculate a corrected medium-exposure parameter and a corrected short-exposure parameter according to the corrected long-exposure parameter, the corrected medium-exposure parameter including a corrected medium-exposure time and a corrected medium-exposure gain, the corrected short-exposure parameter including a corrected short-exposure time and a corrected short-exposure gain; and control the pixel unit array to be exposed according to the corrected long-exposure parameter, the corrected medium-exposure parameter and the corrected short-exposure parameter, so as to output a high dynamic range image.

As illustrated in FIG. 14, in some embodiments, the acts at block 021-022 can be implemented by the processor 60. The processor 60 can be further configured to acquire a long-exposure histogram according to the initial long-exposure pixel information and to calculate the corrected long-exposure parameter according to the long-exposure histogram. The acts at block 0221-0224 can be implemented by the processor 60. When the processor 60 performs the act at block 022, the processor 60 can be perform the followings: acquiring an under-exposure region where long-exposure pixels each with an initial brightness less than a reference brightness are located in a long-exposure histogram of a current preview image frame; performing an iteration control to cause a brightness of a region corresponding to the under-exposure region in a long-exposure histogram of a next preview image frame to be greater than or equal to the reference brightness; recording a long-exposure adjustment time required for adjusting the initial brightness to the reference brightness; and acquiring the corrected long-exposure time according to the initial long-exposure time and the long-exposure adjustment time.

As illustrated in FIG. 14, in some embodiments, the acts at blocks 031-033 can be implemented by the processor 60.

In other words, the processor 60 can be further configured to acquire a long-exposure histogram according to the initial long-exposure pixel information, to calculate a long-short exposure ratio according to the long-exposure histogram; and to calculate the corrected medium-exposure parameter and the corrected short-exposure parameter according to the corrected long-exposure parameter and the long-short exposure ratio. The acts at blocks 0321-0323 may be implemented by the processor 60. In other words, when the processor 60 performs the act at block 032, the processor 60 performs the followings: selecting long-exposure pixels each with a brightness greater than a predetermined brightness from the long-exposure histogram; calculating an average brightness according to the brightness of each of the long-exposure pixels; and calculating the long-short exposure ratio according to the average brightness and a target brightness.

The present disclosure further provides a computer-readable storage medium. One or more non-volatile computer-readable storage medium, comprising computer-executable instructions that, when executed by the processor 60, cause the processor 60 to perform the imaging control method described above.

For example, when the computer-executable instructions are executed by one or more processors 60, the processor 60 is caused to perform the followings: 01, controlling the long-exposure pixels to be exposed with an initial long-exposure parameter so as to acquire initial long-exposure pixel information, controlling the medium-exposure pixels to be exposed with an initial medium-exposure parameter so as to acquire initial medium-exposure pixel information and controlling the short-exposure pixels to be exposed with an initial short-exposure parameter so as to acquire initial short-exposure pixel information, the initial long-exposure parameter including an initial long-exposure time and an initial long-exposure gain, the initial medium-exposure parameter including an initial medium-exposure time and an initial medium-exposure gain, the initial short-exposure parameter including an initial short-exposure time and an initial short-exposure gain; 02, calculating a corrected long-exposure parameter according to the initial long-exposure pixel information, the corrected long-exposure parameter including a corrected long-exposure time and a corrected long-exposure gain; 03, calculating a corrected medium-exposure parameter and a corrected short-exposure parameter according to the corrected long-exposure parameter, the corrected medium-exposure parameter including a corrected medium-exposure time and a corrected medium-exposure gain, the corrected short-exposure parameter including a corrected short-exposure time and a corrected short-exposure gain; and 04, controlling the pixel unit array 31 to be exposed according to the corrected long-exposure parameter, the corrected medium-exposure parameter and the corrected short-exposure parameter, so as to output a high dynamic range image.

For another example, when the computer-executable instructions are executed by one or more processors 60, the processor 60 is caused to perform the followings: 0221, acquiring an under-exposure region in the long-exposure histogram of a current preview image frame, in which each of the long-exposure pixels in the under-exposure region has an initial brightness less than a reference brightness; 0222, performing an iteration control to cause a brightness of a region corresponding to the under-exposure region in a long-exposure histogram of a next preview image frame to be greater than or equal to the reference brightness; 0223, recording a long-exposure adjustment time required for adjusting the initial brightness to the reference brightness; and 0224, acquiring the corrected long-exposure time according to the initial long-exposure time and the long-exposure adjustment time.

Figure 15:
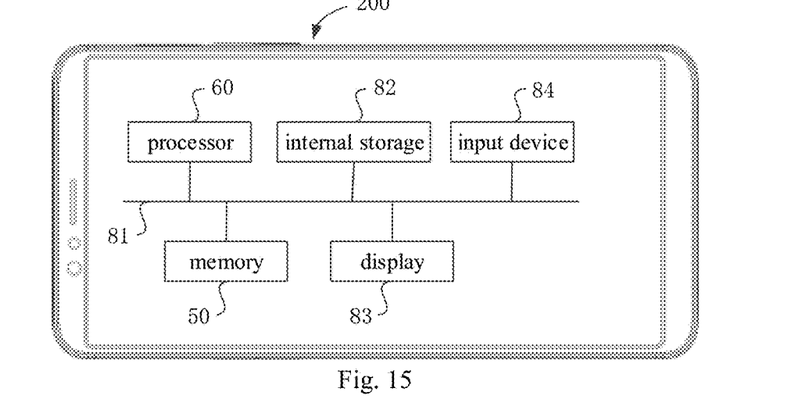
FIG. 15 is a schematic diagram of a computer device according to an embodiment of the present disclosure.

As illustrated in FIG. 15, the present disclosure further provides a computer device 200. The computer device 200 includes a memory 50 and a processor 60. The memory 50 stores therein computer-readable instructions that, when executed by the processor 60, cause the processor 60 to perform the imaging control method described above.

FIG. 15 is a schematic diagram of a computer device 200 according to an embodiment of the present disclosure. The computer device 200 includes a processor 60, a memory 50 (for example non-volatile computer-readable storage medium), an internal storage 82, a display 83 and an input device 84 connected via a system bus 81. The memory 50 of the computer device 200 stores an operating system and computer-readable instructions. The computer-readable instructions can be executed by the processor 60 to implement the imaging control method according to the embodiment of the present disclosure. The processor 60 is configured to provide a computing and controlling capacity, to support running of the computer device 200. The internal storage 82 of the computer device 200 provides an environment of running of the computer-readable instructions in the memory 50. The display 83 of the computer device 200 may be a liquid crystal display, an electronic ink display or the like. The input device 84 may be a touch layer covering the display, or may be a button, a trackball, or a touch panel disposed on a shell of the computer device 200, or may be an external keyboard, a touch panel, a mouse or the like. The computer device 200 may be a phone, a tablet computer, a notebook computer, a personal digital assistant or a wearable device (for example, a smart bracelet, a smart watch, a smart helmet, smart glasses). It can be understood by those skilled in the art, the structure illustrated in FIG. 15 is merely a schematic diagram of a related partial structure of the technical solution of the present disclosure, but should not be understood as limitation to the computer device 200 implementing the technical solution of the present disclosure. The computer device 200 may include more or less components than those illustrated, or some components may be combined, or the components may be arranged differently.

Figure 16:
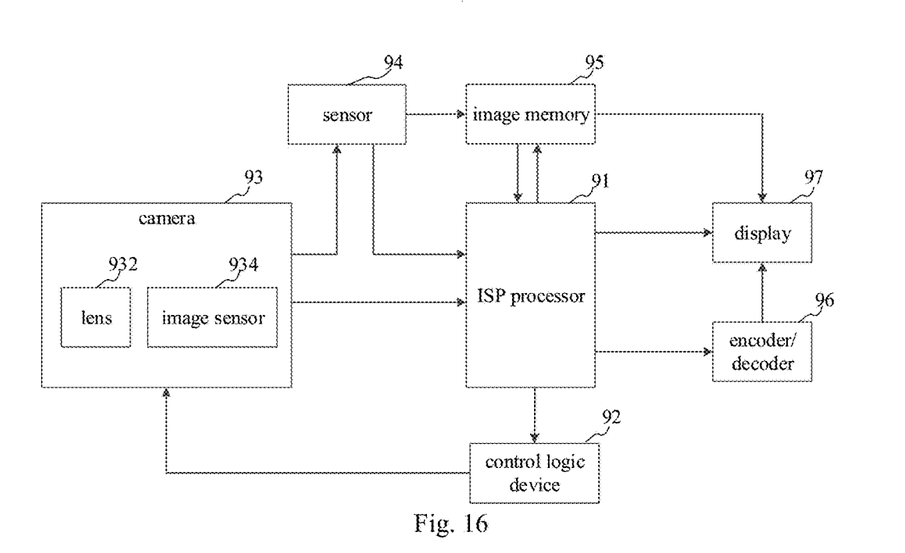
FIG. 16 is a block diagram of an image processing circuit according to an embodiment of the present disclosure.

As illustrated in FIG. 16, the computer device 200 according to the embodiment of the present disclosure includes an image processing circuit 90, which may be implemented by hardware and/or software components, including various processing units defining image signal processing (ISP) pipelines. FIG. 16 is a schematic diagram of the image processing circuit 90 according to an embodiment of the present disclosure. As illustrated in FIG. 16, for ease of description, merely various aspects of the image processing technology related to the embodiments of the present disclosure are illustrated.

As illustrated in FIG. 16, the image processing circuit 90 includes an ISP processor 91 (which may be the processor 60) and a control logic device 92. Image data captured by a camera 93 is processed by the ISP processor 91. The ISP processor 91 analyzes the image data to capture image statistical information for determining one or more control parameters of the camera 93. The camera 93 may include one or more lens 932 and an image sensor 934. The image sensor 934 may include a color filter array (for example, Bayer filter). The image sensor 934 may acquire light intensity and wavelength information captured by each imaging pixel and provide a set of original image data can be processed by the ISP processor 91. The sensor 94 (such as gyroscope) may provide the collected image processing parameters (for example, an anti-shake parameter) to the ISP processor 91 via a type of an interface of the sensor 94. The interface of the sensor 94 may be a standard mobile imaging architecture (SMIA) interface, other series or parallel camera interfaces, or a combination thereof.

In addition, the image sensor 934 may send the original image data to the sensor 94, and the sensor 94 may provide the original image data to the ISP processor 91 via the type of an interface of the sensor 94 or stores the original image data in an image memory 95.

The ISP processor 91 may process the original image data on the pixel-by-pixel basis according to various formats. For example, each image pixel may have bit depth of 8, 10, 12 or 14. The ISP processor 91 may perform one or more image processing operations on the original image data, and collect the statistical information of the image data. The image processing operations can be performed according to the same or different precisions of the bit depth.

The ISP processor 91 may further receive the image data from the image memory 95. For example, the interface of the sensor 94 may send the original image data to the image memory 95. The original image data in the image memory 95 is further provided to the ISP processor 91 for processing. The image memory 95 may be the memory 50, a part of the memory 50, a storage device, a stand lone dedicated memory in an electronic device, and may have a direct memory access (DMA) characteristic.

When the original image data from the interface of the image sensor 934, the interface of the sensor 94 or the image memory 95 is received, the ISP processor 91 may perform one or more image processing operations, for example time-domain filtering. The processed image data can be send to the image memory 95 for being further processed before being displayed. The ISP processor 91 may receive the processed data from the image memory 91, and perform image data processing on the processed data in an original domain and a RGB and YCbCr color space. The image data processed by the ISP processor 91 may be outputted to a display 91 (the display 91 may include the display 83) for being viewed by the user or being processed by a graphics engine or a graphics processing unit (GPU). Further, the output of the ISP processor 91 can be sent to the image memory 95, and the display 91 can be read the image data from the image memory 95. In an embodiment, the image memory 95 can be configured as one or more frame buffers. In addition, the output of the ISP processor 91 can be sent to an encoder/decoder 96 for being encoded or decoded. The encoded image data can be stored and decompressed before being displayed on the display 97. The encoder/decoder 96 may be implemented by a CPU, a GPU or a coprocessor.

The statistical information determined by the ISP processor 91 can be sent to the control logic device 92. For example, the statistical information may include statistical information of the image sensor 934, such as information on auto exposure, auto white balance, auto focusing, scintillation detection, black level compensation, lens shading correction or the like. The control logic device 92 may include processing components and/or microcontrollers for executing one or more routines (such as firmware). One or more routines may determine control parameters of the camera 93 and control parameters of the ISP processor 91 according to the received statistical information. For example, the control parameters of the camera 93 may include control parameters (for example, gain, exposure control integral time, anti-shake parameter or the like) of the sensor 94, a camera flash control parameter, control parameters (for example, focusing or zooming focal length) of the lens 932, or a combination of these parameters. The ISP control parameters may include the gain level for auto white balance and color adjustment (for example, during RGB processing), a color correction matrix and a shaking correction parameter of the lens 932.

For example, the processor 60 in FIG. 15 and the image processing circuit 90 (ISP processor 91) in FIG. 16 can be used for performing the imaging control method including: 01, controlling the long-exposure pixels to be exposed with an initial long-exposure parameter so as to acquire initial long-exposure pixel information, controlling the medium-exposure pixels to be exposed with an initial medium-exposure parameter so as to acquire initial medium-exposure pixel information and controlling the short-exposure pixels to be exposed with an initial short-exposure parameter so as to acquire initial short-exposure pixel information, the initial long-exposure parameter including an initial long-exposure time and an initial long-exposure gain, the initial medium-exposure parameter including an initial medium-exposure time and an initial medium-exposure gain, the initial short-exposure parameter including an initial short-exposure time and an initial short-exposure gain; 02, calculating a corrected long-exposure parameter according to the initial long-exposure pixel information, the corrected long-exposure parameter including a corrected long-exposure time and a corrected long-exposure gain; 03, calculating a corrected medium-exposure parameter and a corrected short-exposure parameter according to the corrected long-exposure parameter, the corrected medium-exposure parameter including a corrected medium-exposure time and a corrected medium-exposure gain, the corrected short-exposure parameter including a corrected short-exposure time and a corrected short-exposure gain; and 04, controlling the pixel unit array 31 to be exposed according to the corrected long-exposure parameter, the corrected medium-exposure parameter and the corrected short-exposure parameter, so as to output a high dynamic range image.

For another example, the processor 60 in FIG. 15 and the image processing circuit 90 (ISP processor 91) in FIG. 16 can be used for performing the imaging control method including: 0221, acquiring an under-exposure region in the long-exposure histogram of a current preview image frame, in which each of the long-exposure pixels in the under-exposure region has an initial brightness less than a reference brightness; 0222, performing an iteration control to cause a brightness of a region corresponding to the under-exposure region in a long-exposure histogram of a next preview image frame to be greater than or equal to the reference brightness; 0223, recording a long-exposure adjustment time required for adjusting the initial brightness to the reference brightness; and 0224, acquiring the corrected long-exposure time according to the initial long-exposure time and the long-exposure adjustment time.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

In addition, terms such as "first" and "second" are used herein for purposes of description and are not intended to indicate or imply relative importance or significance. Thus, the feature defined with "first" and "second" may comprise one or more this feature. In the description of the present disclosure, "a plurality of" means two or more than two, unless specified otherwise.

It will be understood that, the flow chart or any process or method described herein in other manners may represent a module, segment, or portion of code that comprises one or more executable instructions to implement the specified logic function(s) or that comprises one or more executable instructions of the steps of the progress. Although the flow chart shows a specific order of execution, it is understood that the order of execution may differ from that which is depicted. For example, the order of execution of two or more boxes may be scrambled relative to the order shown.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks, CD, etc. Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. An imaging control method, applicable to an imaging device, wherein the imaging device comprises a pixel unit array comprising photosensitive pixels, the photosensitive pixels comprise long-exposure pixels, medium-exposure pixels and short-exposure pixels, and the imaging control method comprises:
   controlling the long-exposure pixels to be exposed with an initial long-exposure parameter so as to acquire initial long-exposure pixel information, controlling the medium-exposure pixels to be exposed with an initial medium-exposure parameter so as to acquire initial medium-exposure pixel information and controlling the short-exposure pixels to be exposed with an initial short-exposure parameter so as to acquire initial short-exposure pixel information, the initial long-exposure parameter comprising an initial long-exposure time and an initial long-exposure gain, the initial medium-exposure parameter comprising an initial medium-exposure time and an initial medium-exposure gain, the initial short-exposure parameter comprising an initial short-exposure time and an initial short-exposure gain;
   calculating a corrected long-exposure parameter according to the initial long-exposure pixel information, the corrected long-exposure parameter comprising a corrected long-exposure time and a corrected long-exposure gain;
   calculating a corrected medium-exposure parameter and a corrected short-exposure parameter according to the corrected long-exposure parameter, the corrected medium-exposure parameter comprising a corrected medium-exposure time and a corrected medium-exposure gain, the corrected short-exposure parameter comprising a corrected short-exposure time and a corrected short-exposure gain; and
   controlling the pixel unit array to be exposed according to the corrected long-exposure parameter, the corrected medium-exposure parameter and the corrected short-exposure parameter, so as to output a high dynamic range image.

2. The method according to claim 1, wherein the pixel unit array is a Bayer array, the long-exposure pixels comprise photosensitive pixels with red channel, photosensitive pixels with green channel and photosensitive pixels with blue channel, the medium-exposure pixels comprise photosensitive pixels with red channel, photosensitive pixels with green channel and photosensitive pixels with blue channel, and the short-exposure pixels comprise photosensitive pixels with red channel, photosensitive pixels with green channel and photosensitive pixels with blue channel.

3. The method according to claim 1, wherein the pixel unit array comprises a plurality of pixel units, each pixel unit comprises the long-exposure pixel, the medium-exposure pixel and the short-exposure pixel, the long-exposure pixel, the medium-exposure pixel and the short-exposure pixel in each pixel unit have a same color channel.

4. The method according to claim 1, wherein controlling the long-exposure pixels to be exposed with an initial long-exposure parameter so as to acquire initial long-exposure pixel information, controlling the medium-exposure pixels to be exposed with an initial medium-exposure parameter so as to acquire initial medium-exposure pixel information and controlling the short-exposure pixels to be exposed with an initial short-exposure parameter so as to acquire initial short-exposure pixel information comprises:
   controlling the medium-exposure pixels to be exposed with the initial medium-exposure parameter and the short-exposure pixels to be exposed with the initial short-exposure parameter during an execution of controlling the long-exposure pixels to be exposed with the initial long-exposure parameter, so as to acquire the initial long-exposure pixel information, the initial medium-exposure pixel information and the initial short-exposure pixel information.

5. The method according to claim 1, wherein calculating the corrected long-exposure parameter according to the initial long-exposure pixel information comprises:
   acquiring a long-exposure histogram according to the initial long-exposure pixel information, the long-exposure histogram representing a brightness distribution of the initial long-exposure pixel information; and
   calculating the corrected long-exposure parameter according to the long-exposure histogram.

6. The method according to claim 5, wherein calculating the corrected long-exposure parameter according to the long-exposure histogram comprises:
   acquiring an under-exposure region in the long-exposure histogram of a current preview image frame, wherein each of the long-exposure pixels in the under-exposure region has an initial brightness less than a reference brightness;
   performing an iteration control to cause a brightness of a region corresponding to the under-exposure region in a long-exposure histogram of a next preview image frame to be greater than or equal to the reference brightness;
   recording a long-exposure adjustment time required for adjusting the initial brightness to the reference brightness; and
   acquiring the corrected long-exposure time according to the initial long-exposure time and the long-exposure adjustment time.

7. The method according to claim 6, wherein the iteration control comprises:
   determining whether the brightness of the region corresponding to the under-exposure region in the long-exposure histogram of a next preview image frame is less than the reference brightness;

when the brightness of the region corresponding to the under-exposure region is greater than or equal to the reference brightness, quitting the iteration control;

when the brightness of the region corresponding to the under-exposure region is less than the reference brightness, controlling the long-exposure pixels to be exposed with an adjusted long-exposure time acquired according to a preset adjustment time so as to output adjusted long-exposure pixel information and acquiring a long-exposure histogram according to the adjusted long-exposure pixel information.

8. The method according to claim 1, wherein calculating the corrected medium-exposure parameter and the corrected short-exposure parameter according to the corrected long-exposure parameter comprises:

acquiring a long-exposure histogram according to the initial long-exposure pixel information;

calculating a long-short exposure ratio according to the long-exposure histogram; and calculating the corrected medium-exposure parameter and the corrected short-exposure parameter according to the corrected long-exposure parameter and the long-short exposure ratio.

9. The method according to claim 8, wherein calculating the long-short exposure ratio according to the long-exposure histogram comprises:

selecting long-exposure pixels each with a brightness greater than a predetermined brightness from the long-exposure histogram;

calculating an average brightness according to the brightness of each of the long-exposure pixels; and calculating the long-short exposure ratio according to the average brightness and a target brightness.

10. The method according to claim 8, wherein a ratio of a product of the corrected long-exposure time and the long-exposure gain to a product of the corrected medium-exposure time and the corrected medium-exposure gain is determined as a long-medium exposure ratio; a ratio of the product of the corrected medium-exposure time and the corrected medium-exposure gain to a product of the corrected short-exposure time and the corrected short-exposure gain is determined as a medium-short exposure ratio, and the long-medium exposure ratio is equal to the medium-short exposure ratio.

11. The method according to claim 1, wherein controlling the pixel unit array to be exposed according to the corrected long-exposure parameter, the corrected medium-exposure parameter and the corrected short-exposure parameter, so as to output the high dynamic range image comprises:

controlling the pixel unit array to be exposed according to the corrected long-exposure parameter, the corrected medium-exposure parameter and the corrected short-exposure parameter so as to acquire corrected long-exposure pixel information, corrected medium-exposure pixel information and corrected short-exposure pixel information;

acquiring a plurality of merged pixel information according to the corrected long-exposure pixel information, the corrected medium-exposure pixel information and the corrected short-exposure pixel information;

compressing a gray level of each merged pixel information; and acquiring the high dynamic range image by performing an interpolation on the plurality of merged pixel information.

12. The method according to claim 1, wherein the corrected long-exposure gain, the corrected medium-exposure gain and the corrected short-exposure gain are equal.

13. An imaging device, comprising a pixel unit array comprising photosensitive pixels, the photosensitive pixels comprise long-exposure pixels, medium-exposure pixels and short-exposure pixels, and the imaging device further comprises a processor configured to:

control the long-exposure pixels to be exposed with an initial long-exposure parameter so as to acquire initial long-exposure pixel information, control the medium-exposure pixels to be exposed with an initial medium-exposure parameter so as to acquire initial medium-exposure pixel information and control the short-exposure pixels to be exposed with an initial short-exposure parameter so as to acquire initial short-exposure pixel information, the initial long-exposure parameter comprising an initial long-exposure time and an initial long-exposure gain, the initial medium-exposure parameter comprising an initial medium-exposure time and an initial medium-exposure gain, the initial short-exposure parameter comprising an initial short-exposure time and an initial short-exposure gain;

calculate a corrected long-exposure parameter according to the initial long-exposure pixel information, the corrected long-exposure parameter comprising a corrected long-exposure time and a corrected long-exposure gain;

calculate a corrected medium-exposure parameter and a corrected short-exposure parameter according to the corrected long-exposure parameter, the corrected medium-exposure parameter comprising a corrected medium-exposure time and a corrected medium-exposure gain, the corrected short-exposure parameter comprising a corrected short-exposure time and a corrected short-exposure gain; and control the pixel unit array to be exposed according to the corrected long-exposure parameter, the corrected medium-exposure parameter and the corrected short-exposure parameter, so as to output a high dynamic range image.

14. The imaging device according to claim 13, wherein the pixel unit array is a Bayer array, the long-exposure pixels comprise photosensitive pixels with red channel, photosensitive pixels with green channel and photosensitive pixels with blue channel, the medium-exposure pixels comprise photosensitive pixels with red channel, photosensitive pixels with green channel and photosensitive pixels with blue channel, and the short-exposure pixels comprise photosensitive pixels with red channel, photosensitive pixels with green channel and photosensitive pixels with blue channel.

15. The imaging device according to claim 13, wherein the pixel unit array comprises a plurality of pixel units, each pixel unit comprises the long-exposure pixel, the medium-exposure pixel and the short-exposure pixel, the long-exposure pixel, the medium-exposure pixel and the short-exposure pixel in each pixel unit have a same color channel.

16. The imaging device according to claim 13, wherein the processor is further configured to:

acquire a long-exposure histogram according to the initial long-exposure pixel information; and calculate the corrected long-exposure parameter according to the long-exposure histogram.

17. The imaging device according to claim 16 wherein the processor is further configured to:

acquire an under-exposure region in the long-exposure histogram of a current preview image frame, wherein each of the long-exposure pixels in the under-exposure region has an initial brightness less than a reference brightness;

perform an iteration control to cause a brightness of a region corresponding to the under-exposure region in a long-exposure histogram of a next preview image frame to be greater than or equal to the reference brightness;

record a long-exposure adjustment time required for adjusting the initial brightness to the reference brightness; and acquire the corrected long-exposure time according to the initial long-exposure time and the long-exposure adjustment time.

18. The imaging device according to claim 13, wherein the processor is further configured to:

acquire a long-exposure histogram according to the initial long-exposure pixel information;

calculate a long-short exposure ratio according to the long-exposure histogram; and calculate the corrected medium-exposure parameter and the corrected short-exposure parameter according to the corrected long-exposure parameter and the long-short exposure ratio.

19. The imaging device according to claim 18, wherein the processor is further configured to:

select long-exposure pixels each with a brightness greater than a predetermined brightness from the long-exposure histogram;

calculate an average brightness according to the brightness of each of the long-exposure pixels; and calculate the long-short exposure ratio according to the average brightness and a target brightness.

20. A non-volatile computer-readable storage medium, comprising computer-executable instructions that, when executed by the processor, cause the processor to perform the imaging control method applicable to an imaging device, wherein the imaging device comprises a pixel unit array comprising photosensitive pixels, the photosensitive pixels comprise long-exposure pixels, medium-exposure pixels and short-exposure pixels, and the imaging control method comprises:

controlling the long-exposure pixels to be exposed with an initial long-exposure parameter so as to acquire initial long-exposure pixel information, controlling the medium-exposure pixels to be exposed with an initial medium-exposure parameter so as to acquire initial medium-exposure pixel information and controlling the short-exposure pixels to be exposed with an initial short-exposure parameter so as to acquire initial short-exposure pixel information, the initial long-exposure parameter comprising an initial long-exposure time and an initial long-exposure gain, the initial medium-exposure parameter comprising an initial medium-exposure time and an initial medium-exposure gain, the initial short-exposure parameter comprising an initial short-exposure time and an initial short-exposure gain;

calculating a corrected long-exposure parameter according to the initial long-exposure pixel information, the corrected long-exposure parameter comprising a corrected long-exposure time and a corrected long-exposure gain;

calculating a corrected medium-exposure parameter and a corrected short-exposure parameter according to the corrected long-exposure parameter, the corrected medium-exposure parameter comprising a corrected medium-exposure time and a corrected medium-exposure gain, the corrected short-exposure parameter comprising a corrected short-exposure time and a corrected short-exposure gain; and controlling the pixel unit array to be exposed according to the corrected long-exposure parameter, the corrected medium-exposure parameter and the corrected short-exposure parameter, so as to output a high dynamic range image.

* * * * *